United States Patent [19]

Miyahara et al.

[11] 4,245,514
[45] Jan. 20, 1981

[54] TRANSMISSION MECHANISM FOR VEHICLES

[75] Inventors: Masayoshi Miyahara; Morimitsu Katayama, both of Sakai, Japan

[73] Assignee: Kubota, Ltd., Japan

[21] Appl. No.: 22,318

[22] Filed: Mar. 20, 1979

[30] Foreign Application Priority Data

May 29, 1978 [JP] Japan ............... 53-64500

[51] Int. Cl.³ .................................. F16H 37/00
[52] U.S. Cl. ........................... 74/15.84; 74/15.4; 74/336 R
[58] Field of Search ............ 74/15.84, 15.4 R, 336 R, 74/337

[56] References Cited

U.S. PATENT DOCUMENTS

| | | | |
|---|---|---|---|
| 2,534,134 | 12/1950 | Kirkpatrick | 74/336 X |
| 2,880,833 | 4/1959 | Stevenson et al. | 74/15.84 X |
| 2,899,034 | 8/1959 | Hubert | 74/15.84 X |
| 2,975,656 | 3/1961 | Haverlender | 74/15.84 X |
| 3,464,277 | 9/1969 | Longshore | 74/15.4 |
| 3,733,912 | 5/1973 | Murayama et al. | 74/15.4 |

*Primary Examiner*—Thomas F. Callaghan
*Attorney, Agent, or Firm*—Kane, Dalsimer, Kane, Sullivan and Kurucz

[57] ABSTRACT

A transmission mechanism for vehicles comprising main clutch means having a primary clutch and a secondary clutch, primary and secondary propeller shafts for primary and secondary transmissions adapted to be intermittently rotated by the operation of said main clutch means, a first transmission system adapted to transmit the transmission power of said primary propeller shaft, a second transmission system adapted to transmit the transmission power of said secondary propeller shaft, and a reduction gearing for interlocking said secondary propeller shaft with said second transmission system. Further disposed is a transmission unit having a uni-directional clutch adapted to permit engine power to be transmitted only in the direction from said secondary propeller shaft to said primary propeller shaft.

6 Claims, 2 Drawing Figures

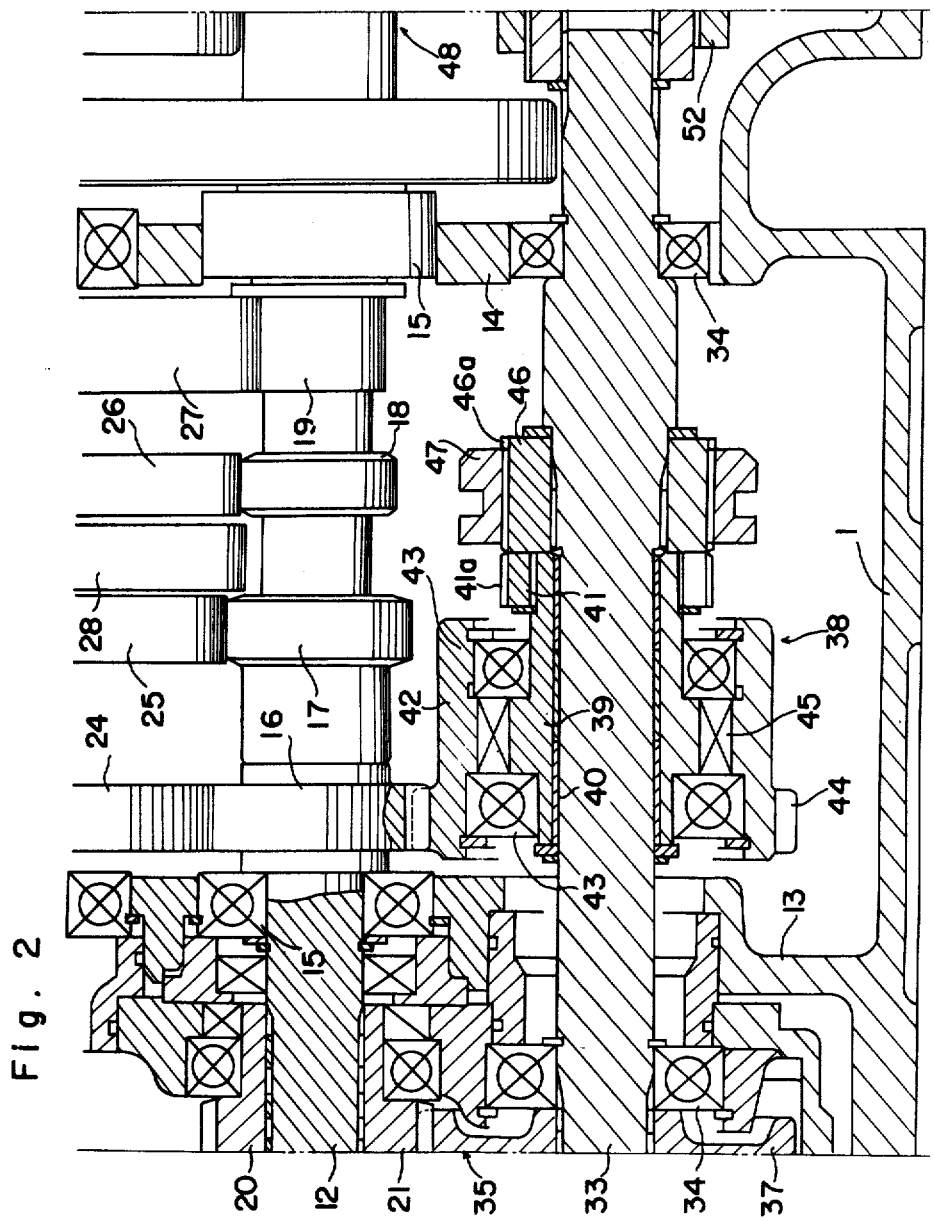

TRANSMISSION MECHANISM FOR VEHICLES

BACKGROUND OF THE INVENTION

The present invention relates to a transmission mechanism for vehicles, for example a transmission mechanism suitable to tractors.

Such a transmission mechanism includes main clutch means adapted to transmit the power of an engine, a primary propeller shaft for primary transmission adapted to be intermittently rotated upon receipt of the engine power by the operation of the main clutch means, a first transmission system for the travelling system adapted to transmit the transmission power of the primary propeller shaft, and a reduction gearing for interlocking a secondary propeller shaft with a second transmission system for transmitting the transmission power thereof.

When the primary clutch and the secondary clutch are turned ON, the transmission power through the primary clutch is transmitted to the first transmission system for the travelling system through the primary propeller shaft, thereby to be further transmitted to the wheels, and the transmission power through the secondary clutch is transmitted to the second transmission system through the secondary propeller shaft, thereby to drive a working machine. If overload is applied to the wheels in such arrangements, the number of rotations of the engine is extremely dropped so that no efficient working is expected, and in the worst case, the engine is stopped. Such inconveniences also take place when the propelling resistance of the wheels is increased by overload applied to the working machine, for example a cultivator, or when the number of rotations of the secondary propeller shaft which drives such cultivator is decreased and the number of rotations of the engine is directly dropped.

It has therefore been desired to construct the transmission mechanism so that efficient working be possible even though overload is applied to the wheels.

SUMMARY OF THE INVENTION

It is an object of the present invention to provide a vehicle transmission mechanism by which the most economical operation may be provided by lowering the vehicle travelling speed when the number of rotations of the engine is dropped due to overload applied to the wheels.

In order to achieve such object, the vehicle transmission mechanism in accordance with the present invention comprises main clutch means having a primary clutch and a secondary clutch adapted to transmit the power of an engine, primary and secondary propeller shafts for primary and secondary transmissions adapted to be intermittently rotated upon receipt of the engine power by the operation of the main clutch means, a first transmission system for the travelling system adapted to transmit the transmission power of the primary propeller shaft, a second transmission system adapted to transmit the transmission power of the secondary propeller shaft, and a reduction gearing for interlocking the secondary propeller shaft with the second transmission system, and is characterized by the provision of a transmission unit disposed at the rear side with respect to the reduction gearing on the second transmission shaft, said transmission unit having a uni-directional clutch adapted to transmit the engine power to the primary propeller shaft from the secondary propeller shaft, but not transmit the engine power in the reverse direction.

The provision of such transmission unit having the uni-directional clutch may constitute a transmission passage from the secondary clutch to the first transmission system for the travelling system through the secondary propeller shaft, the reduction gearing and the transmission unit having the uni-directional clutch, by turning the primary clutch to OFF when overload is applied to the wheels. Since this passage passes through the reduction gearing, the number of rotations of the first transmission system is correspondingly decreased. Therefore, without conducting a gear transmission operation, only the OFF operation of the primary clutch may decrease the travelling speed and transmit a large torque to the travelling wheels, thereby to permit to stand against the overload applied to the wheels. No engine stop therefore takes place and efficient working may be realized.

Due to the provision of the reduction gearing, the number of rotations of the second transmission system is smaller than that of the first transmission system in a normal operation. However, the transmission unit having the uni-directional clutch prevents the increased number of rotations of the first transmission system from being transmitted to the second transmission system; in other words, there is no possibility that the second transmission system having a smaller number of rotations may be an obstacle to the first transmission system. Thus, the first transmission system and the second transmission system normally rotate in their individual number of rotations, respectively and perform their own role independently.

Other objects and advantages of the present invention will be apparent from the following description.

BRIEF DESCRIPTION OF THE DRAWINGS

The present invention will further be described by way of example with reference to the accompanying drawings, in which:

FIG. 2 is an enlarged sectional view of main portions in FIG. 1.

DETAILED DESCRIPTION OF THE PREFERRED EMBODIMENT

Figure 1:
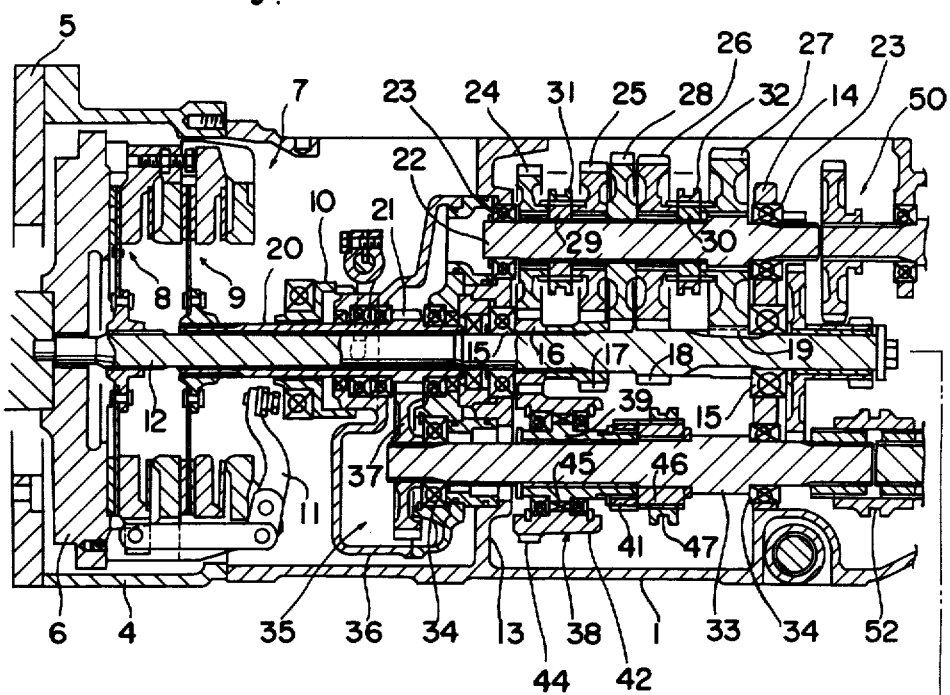
FIG. 1 is a general sectional view of a transmission mechanism for vehicles in accordance with the present invention.
Figure 1:
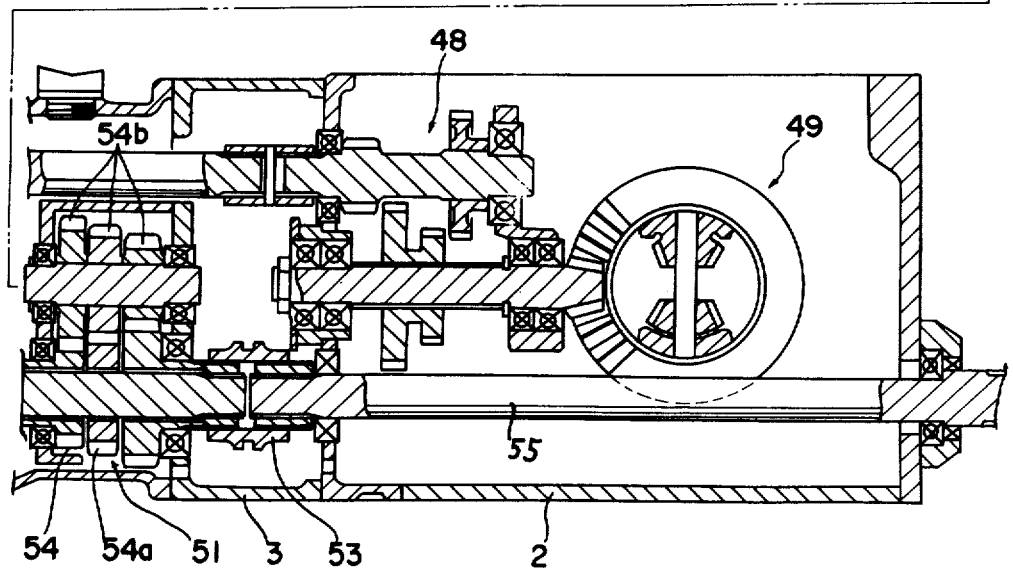

In FIG. 1, a tractor body is constructed by a first transmission case 1, a second transmission case 2 and an intermediate case 3 removably disposed between and connected to the transmission cases 1 and 2.

A clutch housing 4 is disposed between the front end of the first transmission case 1 and an engine frame 5.

An engine flywheel 6 is provided with main clutch means 7 and envelopped with the housing 4.

The main clutch means 7 is of the two-stage pedal type in which a primary clutch 8 for the travelling system and a secondary clutch 9 for the PTO system are disposed.

With a clutch pedal or lever (not shown) slightly pushed down, a clutch release member 10 will act on a clutch lever 11 and the primary clutch 8 will firstly be declutched. With the clutch pedal or lever further pushed down, both the primary and secondary clutches 8 and 9 will be declutched.

A primary propeller shaft 12 is journalled at the front end thereof to the flywheel 6 and also journalled at two axially distanced portions thereof to the walls 13 and 14 of the first transmission case 1 by means of bearings 15. The primary clutch 8 is disposed at this primary propeller shaft 12 and is adapted to transmit the engine power. This primary propeller shaft 12 is provided with four transmission gears 16 to 19 between the bearings 15, each of these gears 16 to 19 having a different diameter.

A secondary propeller shaft 20 is cylindrical and rotatably fitted onto the primary propeller shaft 12. This secondary propeller shaft 20 is provided at the rear end thereof with a gear 21 and is adapted to be rotated by the operation of the secondary clutch 9.

A transmission shaft 22 of the primary transmission system for the travelling system is journalled to the walls 13 and 14 of the first transmission case 1 by a pair of bearings 23. This transmission shaft 22 is disposed above and in parallel with the primary propeller shaft 12 in FIG. 1.

Four transmission gears 24 to 27 having different diameters are rotatably disposed at this transmission shaft 22 in such a manner as to be normally meshed with the gears 16 to 19 on the primary propeller shaft 12.

A reversing gear 28 is also fixed to this transmission shaft 22 for reversing the rotation direction of the primary propeller shaft 12 with respect to the rotation direction of the transmission shaft 22, through intermediate gears (not shown).

Coupling cylinders 29 and 30 are securely fixed to the transmission shaft 22, and coupling pieces 31 and 32 are slidably inserted onto these coupling cylinders 29 and 30, respectively. The operation of these coupling pieces 31 and 32 in the direction of the arrow may provide four-stage speed change.

A secondary transmission shaft 33 for the secondary transmission system is supported below and in parallel with the primary propeller shaft 12 by means of a pair of bearings 34.

A reduction gearing 35 is incorporated in a transmission case 36 independently disposed at the front of the wall 13 of the first transmission case 1, and has a reduction gear 37 in this case 36. This reduction gear 37 is fixed to the secondary transmission shaft 33 and meshed with the gear 21 on the secondary propeller shaft 20.

A transmission unit 38 incorporates a uni-directional clutch and is disposed rotatably at the secondary transmission shaft 33. The detail of this transmission unit 38 is illustrated in FIG. 2.

A transmission case 39 at the driving side is rotatably disposed around the secondary transmission shaft 33 by means of metal fittings 40. A first coupling cylinder 41 having a coupling portion 41a is securely fixed to the rear end of this transmission case 39.

A transmission case 42 at the driven side is rotatably disposed around the transmission case 39 by a pair of bearings 43 and is provided at the outer periphery thereof with a toothed portion 44, which is interlockingly meshed with the forth-speed gear 16 on the first propeller shaft 12.

A uni-directional clutch 45 disposed between the cases 39 and 42 is adapted to transmit the engine power only to the primary propeller shaft 12 from the secondary propeller shaft 20.

A second coupling cylinder 46 having a coupling portion is fixed to the secondary transmission shaft 33 adjacent to the first coupling cylinder 41 of the transmission unit 38. A clutch 47 is slidably disposed for coupling this first coupling cylinder 41 to and decoupling the same from the second coupling cylinder 46.

This clutch 47 is interlockingly connected with an engine overload detector preferably in such a manner as to be turned ON when load is applied, and to be turned OFF when load is decreased. However, it may of course be possible that the clutch 47 is manually turned ON or OFF by the operator based on his experiences.

With reference again in FIG. 1, an auxiliary transmission unit 48 is incorporated in the second transmission case 2 for providing high and low two-stage speed in this embodiment.

A differential gearing 49 is disposed for driving the wheels (not shown). A super-reduction gearing is generally designated by 50.

A PTO transmission unit 51 is disposed between the secondary transmission shaft 33 and a PTO shaft 55. This PTO transmission unit 51 is disposed within or at the front of the intermediatecase 3 between the main transmission unit and the auxiliary transmission unit and provides four-stage speed change by means of six gears 54 with the operations of two clutches 52 and 53. For this purpose, only the central gear 54a is fixed and the both gears adjacent to this gear 54a are idle, and the transmission gears 54b disposed above are all fixed to the shaft.

The description will then be made of the power transmission process in the travelling system.

During the time the primary clutch 8 is turned ON, the primary propeller shaft 12 is driven. Accordingly, when the coupling pieces 31 and 32 are moved in the direction of the arrow for coupling the transmission gears 24–27 to the transmission shaft 22, the four-stage speed change may be provided at the main transmission unit. It is a matter of course that the speed change may be done by the operation of the primary clutch 8. Also, in this embodiment the high/low two-stage speed change may be provided at the auxiliary transmission unit 48, and the wheels are rotated through the differential gearing 49, so that the vehicle may be travelled at a predetermined speed.

In this embodiment, it is also possible to utilize or not to utilize the super-reduction gearing 50 as necessary.

The description will then be made of the power transmission process in the secondary PTO transmission system.

During the time the secondary clutch 9 is turned ON, the secondary propeller shaft 20 is driven and the engine power is transmitted to the secondary transmission shaft 33 through the reduction gearing 35. Accordingly, when the clutch 47 is turned ON and either one of the clutches 52 and 53 of the PTO transmission unit 51 is selectively turned ON, the four-stage speed change in this embodiment may be provided to the PTO system. Even though the primary system is driven at this time, no engine power may be transmitted from the primary propeller shaft 12 to the secondary transmission shaft 33, because the uni-directional clutch 45 is disposed at the transmission unit 38 and the primary propeller shaft 12 is driven fast.

Thus, if overload is applied to the engine for some reason or other during the operation of various kinds with a working machine attached to the tractor, the clutch 47 may be turned ON and the engine power reduced about to 80% by the reduction gearing 35 may subsequently be transmitted to the primary propeller shaft 12 through the transmission unit 38, thereby to eliminate the troubles such as drop in the number of rotations of the engine, or engine stop.

It is desired to arrange the clutch 47 so as to be automatically turned ON and OFF as mentioned earlier.

When the clutch 47 is turned OFF at the time the number of rotations of the engine is restored, the co-operation of the clutch 47 with the transmission unit 38 may provide the same effect as that obtained by operating a so-called double clutch means.

The present invention thus discussed hereinbefore may advantageously achieve the object mentioned earlier, and is therefore very useful.

We claim:

1. A transmission mechanism for vehicles comprising;
   main clutch means having a primary clutch and a secondary clutch adapted to transmit the power of an engine,
   a primary propeller shaft for primary transmission and a secondary propeller shaft for secondary transmission adapted to be intermittently rotated upon receipt of the engine power by the operation of said main clutch means,
   a first transmission system for the travelling system adapted to transmit the transmission power of said primary propeller shaft,
   a second transmissions system adapted to transmit the transmission power of said secondary propeller shaft, and
   a reduction gearing for interlocking said secondary propeller shaft with said second transmission system; and
   characterized by the provision of a transmission unit disposed at the rear side with respect to said reduction gearing on the transmission shaft of said second transmission system, said transmission unit having a uni-directional clutch adapted to transmit the engine power to said primary propeller shaft from said secondary propeller shaft but not to transmit the engine power in the reverse direction.

2. A transmission mechanism for vehicles as set forth in claim 1, further comprising a clutch disposed on said transmission shaft of said second transmission system and adapted to connect said transmission unit to and disconnect the same from said second transmission system, said transmission unit being rotatably disposed at said transmission shaft.

3. A transmission mechanism for vehicles as set forth in claim 2, wherein said second transmission system is the PTO system.

4. A transmission mechanism for vehicles as set forth in claim 2 or 3, wherein said first transmission system is provided with a super-reduction gearing.

5. A transmission mechanism for vehicles as set forth in claim 4, wherein said first transmission system is further provided with an auxiliary transmission unit.

6. A transmission mechanism for vehicles as set forth in claim 4, wherein said transmission unit having the uni-directional clutch comprises a transmission case disposed on said transmission shaft through metal fittings and another transmission case disposed on said transmission case through bearings, said another transmission case being provided at the outer periphery thereof with a toothed portion which is normally meshed with the gear of said first transmission system, said uni-directional clutch being disposed between said transmission case and said another transmission case.

* * * * *